(12) United States Patent
Dupre

(10) Patent No.: US 6,939,465 B2
(45) Date of Patent: Sep. 6, 2005

(54) FLUID FILTER SYSTEM FOR SNOW MAKING APPARATUS

(76) Inventor: Herman K. Dupre, c/o Seven Springs, Champion, PA (US) 15622

( * ) Notice: Subject to any disclaimer, the term of this patent is extended or adjusted under 35 U.S.C. 154(b) by 297 days.

(21) Appl. No.: 10/218,802

(22) Filed: Aug. 14, 2002

(65) Prior Publication Data
US 2004/0031747 A1 Feb. 19, 2004

(51) Int. Cl.⁷ .............................................. B01D 35/16
(52) U.S. Cl. .................... 210/248; 210/312; 210/313; 210/411; 210/445; 210/459; 210/497.3; 239/14.2; 239/DIG. 23
(58) Field of Search ................... 210/106, 248, 210/308, 310, 312, 313, 407, 409, 411, 445, 450, 451–2, 459, 460, 497.3; 137/535; 62/347; 239/2.2, 14.2, DIG. 23

(56) References Cited

U.S. PATENT DOCUMENTS

| | | | |
|---|---|---|---|
| 1,579,485 A | * | 4/1926 | Pasquale ..................... 210/308 |
| 3,794,180 A | * | 2/1974 | Blocker ....................... 210/445 |
| 4,220,176 A | * | 9/1980 | Russell ........................ 137/496 |
| 5,699,961 A | * | 12/1997 | Ratnik et al. .............. 239/14.2 |
| 6,241,802 B1 | * | 6/2001 | Spears et al. .................. 75/414 |
| 6,793,148 B2 | * | 9/2004 | Ratnik ........................ 239/2.2 |

* cited by examiner

Primary Examiner—Joseph Drodge
(74) Attorney, Agent, or Firm—Carothers & Carothers

(57) ABSTRACT

A fluid filtering system for filtering dirt and other debris from fluids being conveyed in a pipeline for snow making apparatus and other devices. An upright pipe segment is connected to a horizontal pipe segment through a pipe elbow or angle for conveying fluid such as water and/or air under pressure from the horizontal pipe segment through the pipe angle and upwardly through the upright pipe segment. A filter is provided in the upright pipe segment adjacent its lower end and an external drain is disposed in the pipe angle directly under the filter to automatically flush and clean the filter when the drain is opened.

7 Claims, 1 Drawing Sheet

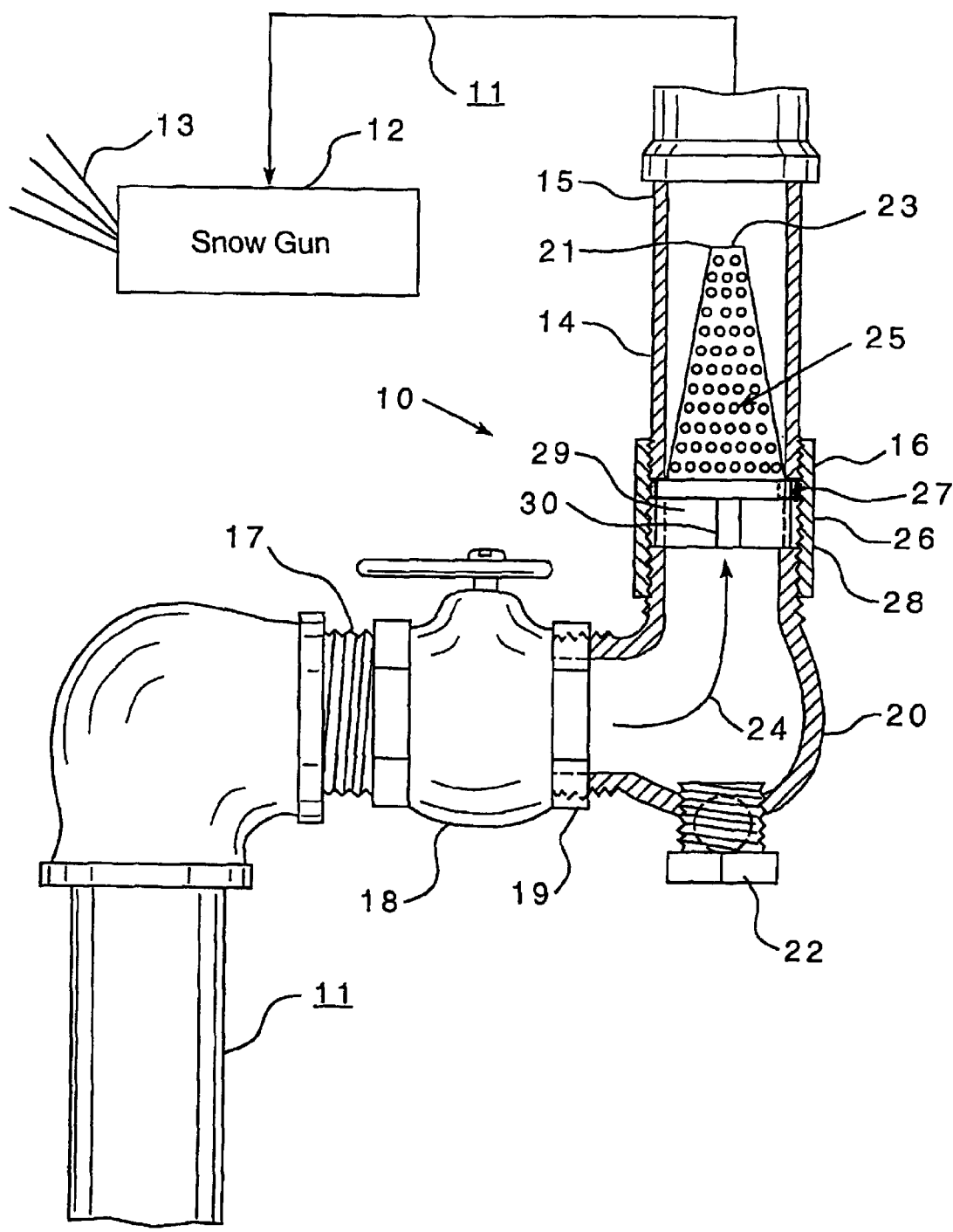

FLUID FILTER SYSTEM FOR SNOW MAKING APPARATUS

BACKGROUND OF THE INVENTION

This invention relates to filtering apparatus, and more particularly, to filtering apparatus for filtering fluids such as water and air under pressure for use in snow making apparatus.

Many different devices have been devised and used for "artificially" producing snow or for producing "man-made" snow. Such devices are utilized at ski resorts to supplement the supply of natural snow on ski trails or in the form of smaller apparatus for home use. Whether the snow making apparatus is situated at ground level or atop a support tower, they are generally referred to as "snow guns" in the industry and they all typically produce snow by projecting a mixture of air and water under pressure in the form of a fine atomized spray into the surrounding sub-freezing ambient atmosphere. The snow guns are of basically two types, one wherein the air and water are internally mixed before spraying into the ambient atmosphere and a second wherein the air and water are externally mixed in the ambient atmosphere such that water spray droplets are projected into a stream of cold air under pressure for atomization of the water spray. A combination of external and internal mixing is also in use. The present invention relates to fluid filtering for snow making apparatus or snow guns which utilize either internal, external or combined mixing techniques.

A principal object of the present invention is to provide a filtering system for such snow making apparatus which will provide a self cleaning filter for filtering out dirt and other debris from air and/or water supplied under pressure through supply lines and hoses feeding such snow guns. If particles are larger than the diameter of the discharge apertures for the water and/or air nozzles, then the nozzles will become plugged and the snow gun is rendered ineffective.

When snow guns are not in use during the off season, insects, dirt and other debris find their way into the detached open hoses which normally connect the snow gun to water and air supplies during the winter season. It is therefore desirable to continuously filter this debris and also provide a filtering system which is effectual and inexpensive and which is also self-cleaning.

SUMMARY OF THE INVENTION

The fluid filtering system of the present invention is provided for filtering dirt and other debris from fluids being conveyed in a pipeline. The system includes an upright pipe segment having upper and lower ends and a horizontal pipe segment connected at one end thereof to the lower end of this upright pipe segment through a pipe elbow or angle for conveying fluid under pressure from the horizontal pipe segment through the pipe angle and on upwardly through the upright pipe segment. The filter is provided in the upright pipe segment adjacent its lower end and an external drain is disposed in the pipe angle under the filter, whereby when the upright pipe segment is drained through the drain debris is flushed from the filter and out of the system through the drain.

The filter is preferably comprised of a rigid perforated cone oriented in the upright pipe whereby the apex of the cone protrudes upwardly into the lower end of the upright pipe segment. If the filter of this configuration were reversed, debris below the filter would tend to become lodged and stuck between the cone shaped filter and the interior walls of the pipe segment.

This combination is inexpensively provided at the lower end of the upright pipe segment where it connects to the pipe angle by using a threaded sleeve coupling and a filter cone which has a bottom outwardly turned annular lip. The lip is dimensioned for annular engagement between the upright pipe lower end and an upper end of the pipe angle. A ring spacer may also be provided as necessary for positioning between and engaging the bottom annular lip of the cone in the upper end of the pipe angle. This prevents any movement of the cone and firmly seats the cone at the bottom of the upright pipe segment. This spacer is preferably a gapped flexible retainer ring which, for example, may be manufactured of an annular plastic pipe segment with a short segment thereof removed so that the remaining portion functions as a flexible retaining ring.

The drain may be a simple valve drain but it is preferably comprised of a spring bias drain valve that is biased to open and drain the upright pipe automatically when internal pressure in the pipe angle attains a predetermined minimum, thereby flushing the debris from the filter downwardly out through the drain. As an example, the predetermined minimum pressure might be selected as 25 psi for water and 35 psi for air, or 25 psi for a combination internal mixture of water and air.

The filtering system of the present invention is particularly designed for use in combination with a snow making gun or apparatus which is connected to the upper end of the upright pipe segment. However, the filter system of the present invention may be used to filter fluids for other applications.

BRIEF DESCRIPTION OF THE DRAWING

Other objects and advantages appear hereinafter in the following description and claims. The accompanying drawing shows, for the purpose of exemplification, without limiting the scope of the invention or appended claims, certain practical embodiments of the present invention wherein FIG. 1 is a schematic view in partial vertical mid cross section illustrating the fluid filtering system of the present invention.

DETAILED DESCRIPTION OF A PREFERRED EMBODIMENT

Referring to FIG. 1, the fluid filtering system 10 of the present invention is provided for filtering dirt and other debris from fluids being conveyed in pipeline 11 ultimately to snow gun 12 for manufacturing snow in sub-freezing ambient atmosphere by ejection of an atomized spray 13 which is an atomized water spray. The pipeline 11 is provided for conveying any suitable liquid, such as water or air, and in this instance, it is shown for the purpose of conveying a mixture of water and air under pressure. However, independent pipelines 11 may be provided to independently supply air under pressure and water under pressure to snow gun 12 as is taught in the prior art for snow making apparatus.

The pipeline 11 includes of upright pipe segment 14 having upper end 15 and lower end 16, horizontal pipe segment 17 with operating valve 18 with one end 19 of horizontal segment 17, including valve 18, connected to the lower end 16 of upright pipe segment 14 with a pipe elbow or angle 20. The filter 21 is disposed in upright pipe segment 14 adjacent its lower end 16 and an external drain is disposed in the pipe angle 20 directly under filter 21.

Filter 21 is comprised of a rigid perforated cone formed of stainless steel or plastic and it is oriented in upright pipe segment 14 whereby its apex 23 protrudes upwardly into the lower end of upright pipe segment 14. This orientation prevents debris flowing with the fluid flow as indicated by arrow 24 from being lodged and pinched between the cone 21 and the interior of upright pipe segment 14, as would be the case if the direction of the cone filter 21 were reversed.

The perforations 25 in cone filter 21 are 0.040 inches in diameter and number approximately 450 in total. The filter passage diameters are selected to correspond with the nozzle apertures used in snow gun 12 so that the perforations 25 are at least no larger than the snow gun spray nozzle apertures.

Upright pipe segment 14 is connected to pipe angle 20 with a conventional threaded sleeve coupling 26 and the cone filter 21 is provided with a bottom outwardly turned annular lip 27 dimensioned for annular engagement between upright pipe lower end 16 and the upper end of pipe angle 20.

Note however that there is a gap between the upper end 28 of pipe angle 20 and the lower portions of perimeter lip 27. This intermediate gap is filled with flexible retainer ring 29. Retainer ring 29 is constructed of a short piece of flexible plastic pipe wherein a small segment thereof is removed to provide gap 30 so that the retainer ring 20 may be compressed and force fit into the coupling 30 whereby it springs outwardly and conforms to the internal dimensions of coupling 30. This spacer holds the annular lip 27 of cone filter 21 in firm position.

Drain 22 is a spring biased drain valve which is biased to open and drain upright pipe segment 14 when internal pressure in the pipe angle 20 attains a predetermined minimum, thereby flushing debris from filter 21 downwardly from the filter and out the underlying drain 22. Thus when the snow making gun 12 is turned off via valve 18, the pressure within elbow 20 will reach a predetermined minimum, say 25 psi, and spring biased ball valve 22 will automatically open and drain all water from vertical pipe segment 14 thereby flushing all debris from the underside of cone filter 21 downwardly and out through the underlying drain 22.

I claim:

1. A snow-making apparatus in combination with a self-cleaning water filtering system for filtering dirt and other debris from water being conveyed in a pipe connected to a spray nozzle, comprising:
   - a snow making apparatus including a spray nozzle having an aperture for spraying water under pressure into ambient pressure,
   - a water supply pipe positioned below said snow-making apparatus, having a horizontal pipe segment connected by a pipe angle to an upright pipe segment, and connected for supplying water under pressure to said snow-making apparatus;
   - a filter in said upright pipe segment; and
   - drain means disposed in said pipe angle upstream from said filter for draining water from said pipe and thereby also cleaning said filter with a back-flow of water in said upright pipe segment through said filter.

2. The filtering system of claim 1 wherein said filter is comprised of a rigid cone with fine filter perforations in said pipe whereby an apex of said cone protrudes downstream into said pipe.

3. The filtering system of claim 2 including a threaded sleeve coupling and said filter cone having a bottom outwardly turned annular lip dimensioned for annular engagement between lower and upper ends of said upright pipe segment at said coupling.

4. The filtering system of claim 3 including a ring spacer disposed between and engaging said bottom annular lip of said cone and said upper end of said pipe segment.

5. The filtering system of claim 4 wherein said spacer is a gapped flexible retainer ring.

6. The filtering system of claim 2 wherein said drain means is comprised of a spring biased drain valve biased to open and drain said pipe when internal pressure in said pipe attains a predetermined minimum and thereby also flushes debris from said filter with water back flow.

7. The filtering system of claim 2 wherein said spray nozzle has a nozzle aperture larger than the perforations of said filter cone.

\* \* \* \* \*